United States Patent
Horgan

(10) Patent No.: US 10,731,728 B2
(45) Date of Patent: Aug. 4, 2020

(54) LIGATURE ATTACHMENT DEVICE

(71) Applicant: Gary Anthony Horgan, Waltham, MA (US)

(72) Inventor: Gary Anthony Horgan, Waltham, MA (US)

( * ) Notice: Subject to any disclaimer, the term of this patent is extended or adjusted under 35 U.S.C. 154(b) by 0 days.

(21) Appl. No.: 15/748,109

(22) PCT Filed: Jul. 25, 2016

(86) PCT No.: PCT/US2016/043838
§ 371 (c)(1),
(2) Date: Jan. 26, 2018

(87) PCT Pub. No.: WO2017/015657
PCT Pub. Date: Jan. 26, 2017

(65) Prior Publication Data
US 2018/0216700 A1    Aug. 2, 2018

Related U.S. Application Data

(60) Provisional application No. 62/365,376, filed on Jul. 21, 2016, provisional application No. 62/358,041, filed on Jul. 3, 2016, provisional application No. 62/213,930, filed on Sep. 3, 2015, provisional application No. 62/195,801, filed on Jul. 23, 2015.

(51) Int. Cl.
*F16G 11/04* (2006.01)
*F16G 15/00* (2006.01)
*F16B 45/02* (2006.01)

(52) U.S. Cl.
CPC ............ *F16G 11/046* (2013.01); *F16G 15/00* (2013.01); *F16B 45/02* (2013.01)

(58) Field of Classification Search
CPC ......... F16B 45/02; F16G 11/046; F16G 15/00
See application file for complete search history.

(56) References Cited

U.S. PATENT DOCUMENTS

| | | | | |
|---|---|---|---|---|
| 329,071 A | * | 10/1885 | Palmer | F16G 11/00 24/129 R |
| 749,235 A | * | 1/1904 | Smith | F16G 11/00 24/129 R |
| 3,409,014 A | * | 11/1968 | Grant | A61B 10/04 606/148 |
| 5,062,794 A | * | 11/1991 | Miura | A61C 7/12 433/10 |

(Continued)

*Primary Examiner* — Robert Sandy
*Assistant Examiner* — David M Upchurch

(57) ABSTRACT

A ligature attachment device for use with a ligature is provided, the ligature attachment device having a proximal section comprising a loop retainer section, a distal section comprising a tool section, a central section comprising a central ligature spool section having a centrally located cinch aperture and the central ligature spool section is coupled to the loop retainer section and the tool section. The loop retainer section having a loop retainer profile configured to retain a loop of the ligature frictionally engaged with the central ligature spool section. The cinch aperture having an aperture shape configured to allow at least two sections of a ligature to be removably retained in the cinch aperture whereby the cinch aperture can removably retain the loop of the ligature. The tool section having a first tool for removably joining a second tool.

23 Claims, 13 Drawing Sheets

(56) References Cited

U.S. PATENT DOCUMENTS

| | | | |
|---|---|---|---|
| 6,473,944 B1* | 11/2002 | Vazin | A43C 1/00 24/129 A |
| 7,797,876 B2* | 9/2010 | McKelvey | A01K 89/08 43/15 |
| D679,701 S * | 4/2013 | Adelman | D14/253 |
| 2007/0259305 A1* | 11/2007 | Roberts | A61C 7/303 433/11 |
| 2009/0133236 A1* | 5/2009 | Vazin | A43C 1/04 24/713 |
| 2013/0263413 A1* | 10/2013 | Polegato Moretti | A43C 7/04 24/713 |

* cited by examiner

VIEW A-A

500

LIGATURE ATTACHMENT DEVICE

CROSS-REFERENCE TO RELATED APPLICATIONS

This application is a 371 National Stage Application of PCT App. No. PCT/US2016/043838, filed on Jul. 25, 2016, entitled "Ligature Attachment Device"; PCT App. No. PCT/US2016/043838 claims the benefit of U.S. App. No. 62/365,376, filed on Jul. 21, 2016, entitled "Supplement 03 for: Ligature Attachment Means for Hooks, Eyelets, Pulleys and More"; PCT App. No. PCT/US2016/043838 also claims the benefit of U.S. App. No. 62/358,041, filed on Jul. 3, 2016, entitled "Ligature Attachment Means, Supplement 02; and In-Line ligature Eyelet, Supplement 01"; PCT App. No. PCT/US2016/043838 also claims the benefit of U.S. App. No. 62/213,930, filed on Sep. 3, 2015, entitled "Supplement 01 for: Ligature Attachment Means for Hooks, Eyelets, Pulleys and More"; PCT App. No. PCT/US2016/043838 also claims the benefit of U.S. App. No. 62/195,801, filed on Jul. 23, 2015, entitled "Ligature Attachment Means for Hooks, Eyelets, Pulleys and More"; and all of the contents of each of these applications is incorporated herein by reference.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC OR AS A TEXT FILE

Not Applicable.

BACKGROUND OF THE INVENTION

Field of the Invention

The present ligature attachment device for hooks and eyelets relates generally to the attachment of ligatures to hardware and equipment used for lifting, pulling, and securing, and more particularly to the simple removable termination of these ligatures without the need to tie or untie them by the incorporation of a cinch configuration.

Description of Related Art

Standard hardware such as hooks, carabiners, and pulleys require one to be knowledgeable in tying proper knots in order to securely terminate a ligature such as rope, or cord, directly to them in order to make use of these tools without the ligature termination failing.

The FIG. 9 Carabiner™, patent pending, from Nite Ize Inc. of 5660 Central Ave. Boulder Colo., is comprised of a pear shaped wire gate carabiner having a set of hooks depending outwardly in opposite directions from the bottom of a vertical member protruding downward from the opposite side of the carabiner as the wire gate, with all these features formed along the same plane. The hook pointing towards the wire gate of the of the pear shaped carabiner has smooth contours, while the hook facing the opposite direction in contrast, is made up of sharp steep angles to bite into any ligature wedged between these two opposing surfaces. The FIG. 9 Carabiner's™ carabiner portion is first latched onto an anchor point, where a ligature that has been secured at another location is hooked around the smoother of the two opposing hooks and pulled tight, then wrapped around the bottom of the two opposing hooks and then up around and through the second wedge shaped hook and pulled tight so that the ligature is wedged deep into the "V" shaped mouth of the second hook. The ligature will stay taught and in place until pulled out from the "V" shaped wedge first, provided there is a constant static load on the ligature. This device is an open loop termination, unlike an eyelet or quick link that are stronger closed loop terminations, whereas the wire gate only serves to prevent unintended decoupling rather than to enhance structural integrity.

The Fish Bone knotless Rope Tie, from Fish Bone knotless Rope Tie, P.O. Box 34595, Las Vegas Nev., is a flat device resembling a fish skeleton which provides a number of channels to wrap and cinch a ligature around at the mid-section and tail, while an eyelet and more channels at the head allow the same ligature, or another ligature, to be fastened there as well. This device is an open loop termination, unlike an eyelet or quick link that are stronger closed loop terminations.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

The ligature attachment device overcomes the disadvantages of the prior art by providing a simple and secure means for removably cinch terminating a ligature, while also having the ability to removably fasten to almost any type of hardware or tool designed to incorporate a ligature in its function. The ligature attachment device also provides a simple and easy removal of the ligature as well.

Because the cinch aperture is a closed loop, no matter what the shape, it is a far stronger ligature termination than any open loop configuration of the same size, shape, and material, for the simple reason that an open loop is like a link in a chain being cut on one side, where when enough tensile force is applied to that chain, the cut link will bend open at its maximum yield strength, and fail long before the uncut links will break at their maximum and much greater tensile strength.

One example embodiment of the ligature attachment device for hooks and eyelets, also called a ligature attachment device, generally comprises three sections being: (1) a first ligature spool section with a cinch aperture to frictionally hold a ligature in place, (2) a loop retainer to prevent a looped section of the ligature from slipping off of the spool section and (3) a tool section to function as a tool or to couple the ligature attachment device and ligature to a tool. The first section is the centrally located ligature spool section, also known as the ligature spool, which a ligature can be wrapped around, while having at least one centrally located cinch aperture for frictionally holding and cinch binding a ligature in place. The second section located at the proximal end of the ligature spool section is the loop retainer section, also known as the loop retainer, which prevents a looped section of ligature, which is wrapped around the ligature spool and frictionally engaged, from slipping off the end of the ligature spool which would otherwise cause the ligature cinch termination to fail. The loop retainer section may contain at least one ligature aperture which keeps the cinch termination taught and helps the ligature attachment device hang in a more vertical position. The loop retainer section may also contain at least one ligature guide channel formed onto the loop retainer and adjacent ligature spool which keeps the cinch termination taught and ligatures together and helps the ligature attachment device hang in a more vertical position. The loop retainer section may also contain an alignment pin and socket in order to keep two mating ligature attachment devices aligned with each other and may contain at least one chamfer cut across the proximal end of the loop retainer in order to aid in separating the distal portions of the ligature attachment device. The third section being the tool section, also known as the tool, which may be any one of a variety of linking devices such as but not limited to a hook, or an eyelet.

In some embodiments, two ligature attachment devices may be used together as a multi-piece ligature attachment device when configured to do so, and where the tool section is in the form of a hook or eyelet. Where, when the two ligature attachment device's tool sections are a hook, they are paired together to form an eyelet and increase strength, and where the tool section is an eyelet, they are paired together to increase strength. Any ligature attachment device designed to be paired with another, is equipped with a means for aligning the two, or a means for hinging them, or both.

In some embodiments, the ligature spool section is integrally attached to the loop retainer section and the tool section, the loop retainer section has a loop retainer cross-sectional profile larger than a ligature spool cross-sectional profile whereby the loop retainer section retains a loop of the ligature frictionally engaged with the ligature spool section, the cinch aperture has a cinch aperture shape configured to allow a first section of the ligature to be frictionally engaged with a cinch end of the cinch aperture, the cinch aperture shape further configured to allow a second section of the ligature to overlap and be frictionally engaged with the first section of the ligature whereby a tensile force of the second section of the ligature increases the frictional engagement of the first section of the ligature with the cinch end, and the tool section comprises a tool.

In some embodiments, the ligature attachment device comprises a proximal section comprising a loop retaining means, a distal section comprising a tool section, a central section comprising a ligature spool section having a cinching means, and the ligature spool section is integrally connected to the loop retainer section and the tool section. In some embodiments, the loop retaining means is configured to retain a loop of the ligature frictionally engaged with the central ligature spool section, the cinching means is further configured to allow at least two sections of a ligature to be removably retained in the cinching means, the cinching means is further configured to allow a first section of the ligature to be frictionally engaged with the cinching means, the cinching means is further configured to allow a second section of the ligature to overlap and be frictionally engaged with the first section of the ligature whereby a tensile force on the second section of the ligature increases the frictional engagement of the first section of the ligature with the cinching means, and the tool section comprises a tool.

Where there are a number of ways to use embodiments of ligature attachment devices to removably terminate a ligature, one example method is to first create a loop of a ligature by folding one end of the ligature back on the longer section of ligature. Next take the looped end and thread it through the widest part of the cinch aperture, pull the loop through the cinch aperture, twist the loop ninety degrees so that the ligature sections are aligned along the length of the cinch aperture and bring the loop forward over the tool section and around the spool section. Next, ensure the ligature section leading to the load bearing section of the ligature is overlapping and providing a frictional force to the other ligature section. Then, work out all the slack in the ligature configuration and push the section of the ligature wrapped around the spool section as close to the loop retainer as possible. The ligature is now securely and removably cinch terminated, and removing the ligature is as simple as reversing the steps used to terminate it.

The ligature attachment device can be produced for any size ligature a particular application requires, where the ligature for which a particular ligature attachment device is designed, would be the optimal ligature size for that particular size ligature attachment device, but that same ligature attachment device will also be able to accommodate smaller diameter ligatures as well. Where for example, one size ligature attachment device could be designed for ¾ inch diameter rope that will fit within its cinch aperture, but will also fit smaller diameter ligatures such as but not limited to ½ inch rope, 3/16 inch cord, and ⅛ inch string.

The advantages and features of the present invention will become apparent to those skilled in the art when the following description is read in conjunction with the attached drawings and the appended claims.

A BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
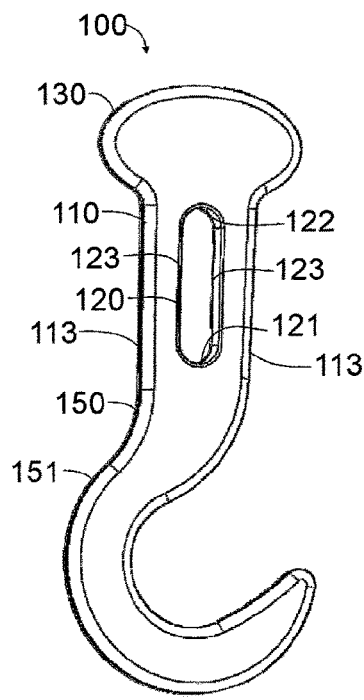
FIG. 1 is a perspective view of the ligature attachment device incorporating a hook as one example of how the tool section may be configured.
Figure 3A:
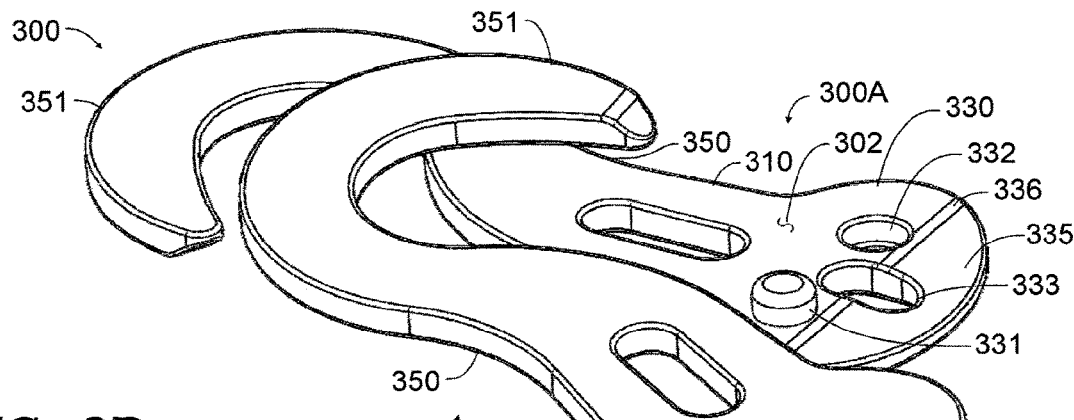
FIGS. 3A, 3B, 3C are perspective views of a pair of ligature attachment devices which are designed to align with pins and sockets, while also having the ability to achieve a hinge like motion by rocking on fulcrums created by chamfer cuts into the edge of the loop retainers perpendicular to the devices central axis.
Figure 4:
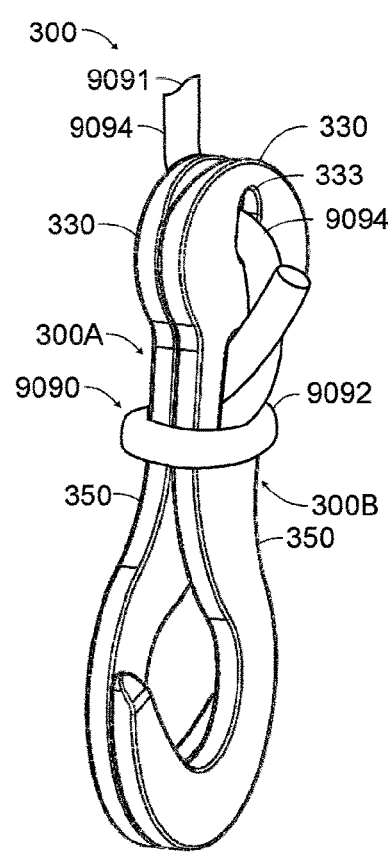

FIG. 4 1 is a perspective view a pair of ligature attachment devices in FIG. 3A with a ligature cinch termination.

FIGS. 5A, 5B, 5C, 5D, 5E, 5F, are a set of 6 plan views of the ligature attachment device in FIG. 3A.

Figure 5A:
Figure 5B:
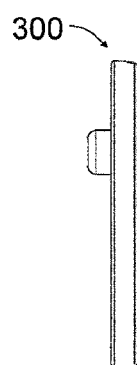
Figure 5C:
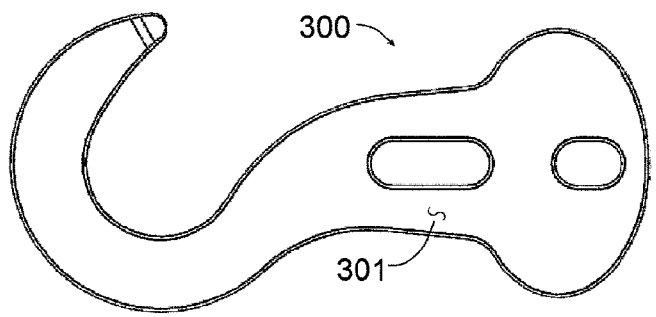
Figure 5D:
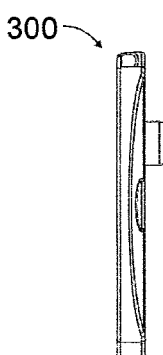
Figure 5E:
Figure 5F:
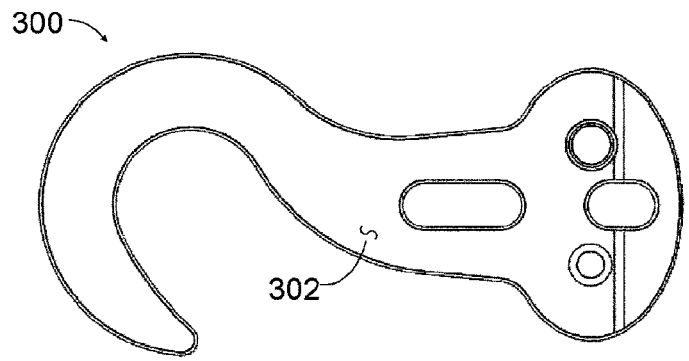
Figure 5G:
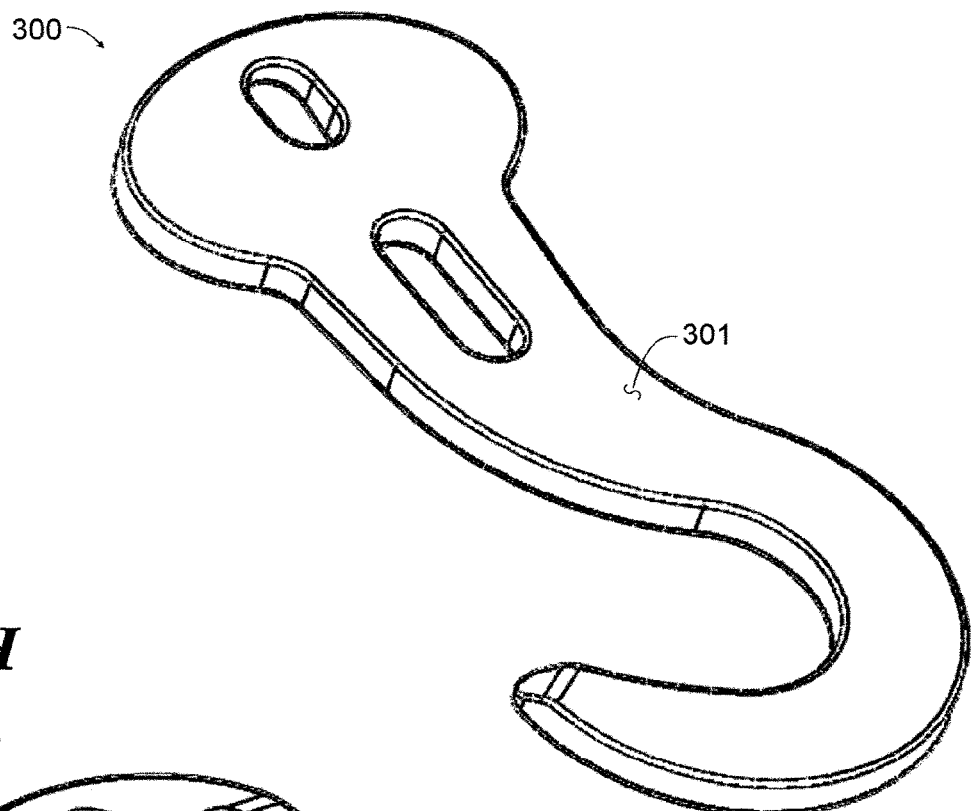
Figure 5H:
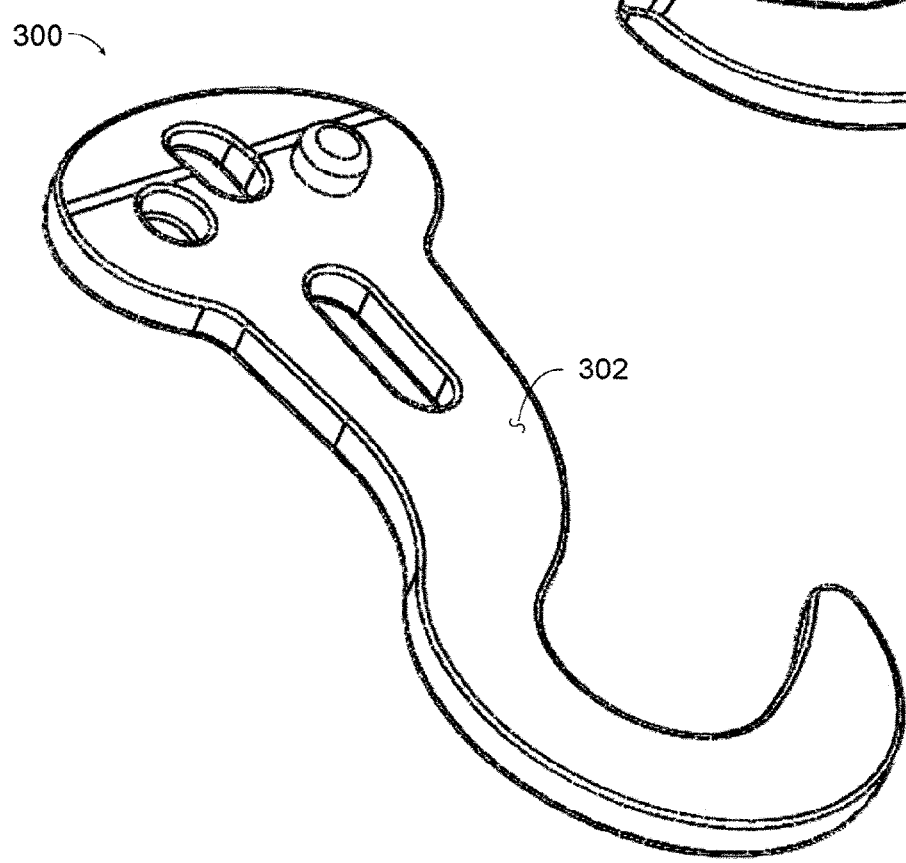

FIGS. 5G, 5H, are two perspective views of the ligature attachment device in FIG. 3A.

Figure 6A:
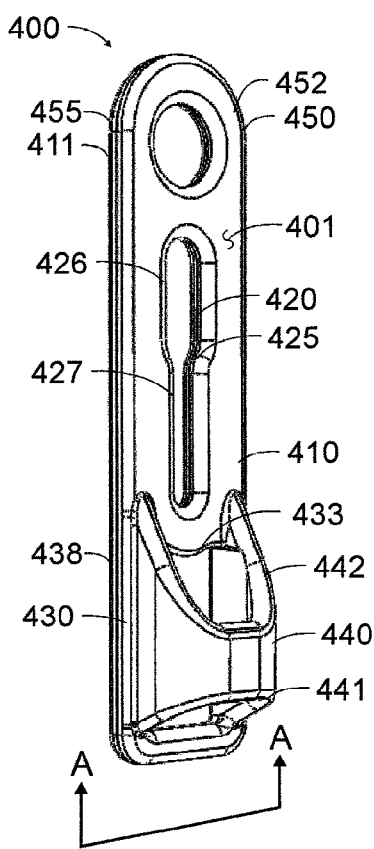
Figure 6B:
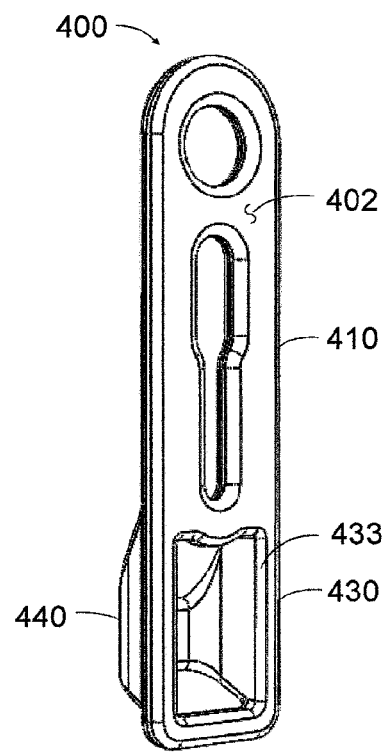

FIGS. 6A, 6B are two perspective views of the ligature attachment device where the loop retainer has a ligature aperture that is cut through most of its center, whereas a ligature guide is formed on the near side of the loop retainer spanning the ligature aperture.

Figure 6C:
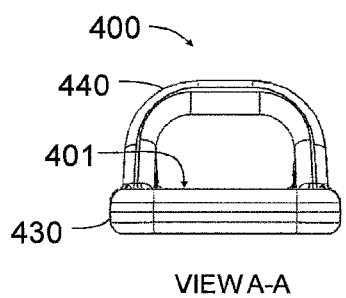

FIG. 6C is proximal end view A-A of the ligature attachment device in FIG. 6A.

Figure 7:
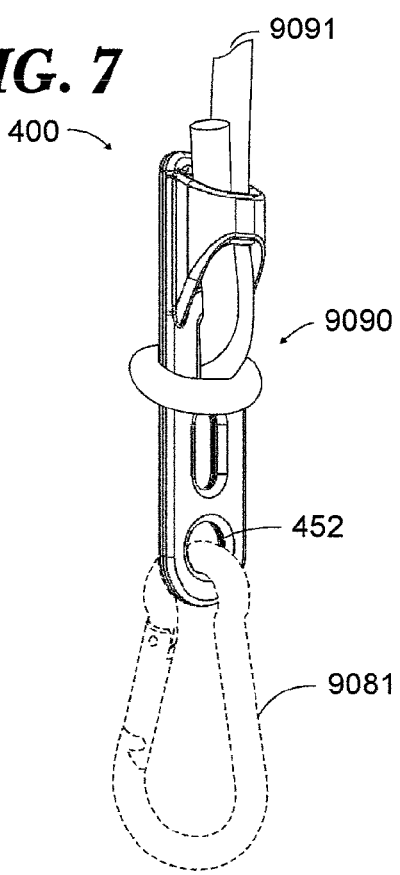

FIG. 7 is a perspective view of the ligature attachment device in FIG. 6A with a ligature end cinch termination, and a spring hook attached to the eyelet portion of the device.

FIG. 8A, 8B, 8C, 8D, 8E, 8F, are a set of 6 plan views of the ligature attachment device in FIG. 6A.

Figure 9A:
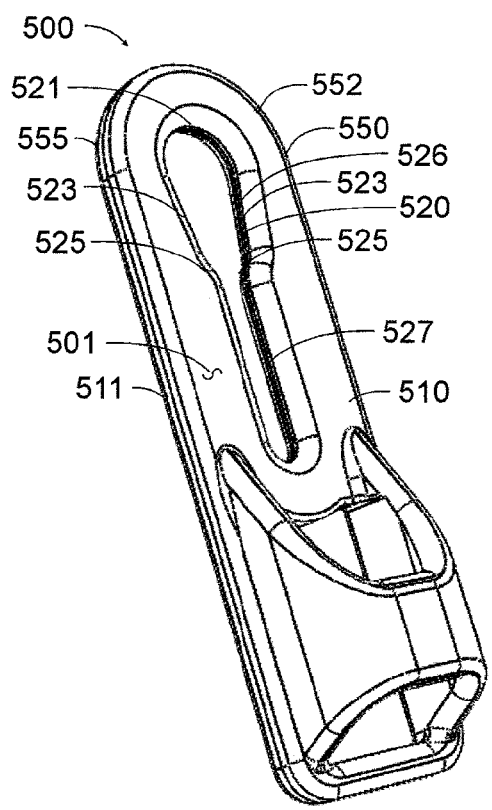
Figure 9B:
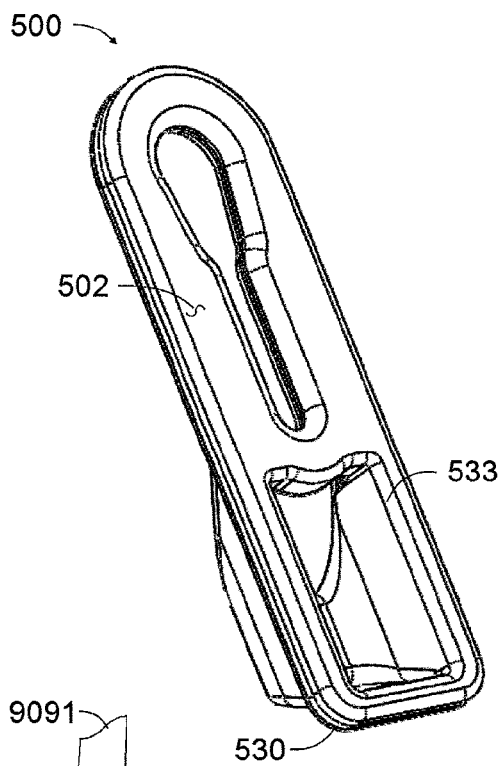

FIGS. 9A, 9B, are two perspective views of the ligature attachment device where the spool, cinch aperture, and eyelet sections are combined to form a shorter ligature attachment device.

Figure 10:
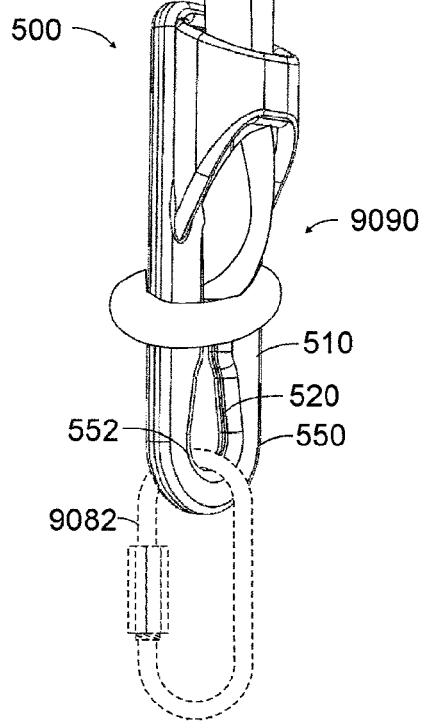

FIG. 10 is a perspective view of the ligature attachment device in FIG. 9A with a ligature end cinch termination, and a quick link attached to the eyelet portion of the device.

FIG. 11A, 11B, 11C, 11D, 11E, 11F, area set of 6 plan views of the ligature attachment device in FIG. 9A.

FIGS. 12A, 12B, 12C, 12D, are a sequence of images illustrating how a ligature end would be cinch terminated to the ligature attachment device in FIG. 6A.

FIGS. 13A, 13B, 13C, 13D, 13E, 13F, are a sequence of images illustrating how a ligature fixed loop would be cinch terminated to the ligature attachment device in FIG. 6A.

FIGS. 14A, 14B, 14C, 14D, are a sequence of images illustrating how a ligature rope switch configuration would be terminated to the ligature attachment device in FIG. 6A.

Figure 15:
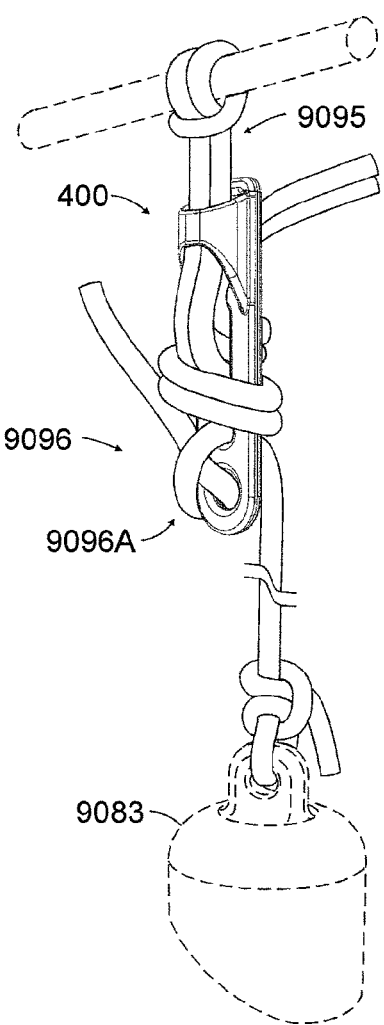

FIG. 15 is a perspective view of the ligature attachment device in FIG. 6A with two separate ligature cinch terminations, a fixed loop termination and a rope switch termination used for adjusting the height of objects.

Figure 16:
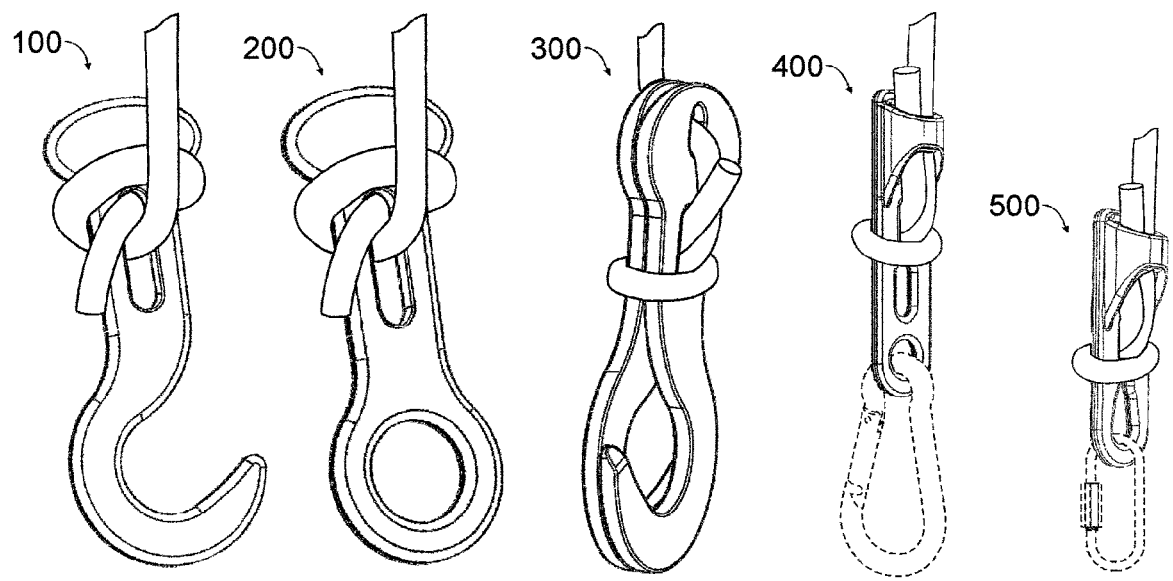

FIG. 16 is a set of perspective views of the ligature attachment device shown in five embodiments thereof.

DETAILED DESCRIPTION OF THE INVENTION

Ligature attachment device for hooks and eyelets and methods of use will now be described in detail with reference to the accompanying drawings. It will be appreciated that the device and methods disclosed herein have wide applicability. For example, the ligature attachment device for hooks and eyelets and methods of use may be readily employed with ligatures such as but not limited to rope, cord, shock cord, webbing, electrical cord, string, or thread. Notwithstanding the specific example embodiments set forth below, all such variations and modifications that would be envisioned by one of ordinary skill in the art are intended to fall within the scope of this disclosure.

As used herein, in addition to the definitions used in the art, unless otherwise specified, a length and a width is measured relative to a longitudinal axis of the ligature attachment device where the length runs in parallel to the longitudinal axis and the width runs perpendicular to that axis. A thickness is a thickness of the width as measured perpendicular to the axis and perpendicular to the width.

As used herein, in addition to the definitions used in the art, unless otherwise specified, a cross-sectional profile comprises a width and a thickness across a section element referenced.

As used herein, unless otherwise specified, a shape represents the length and width of the referenced element similarly related to the length and width of the ligature attachment device.

As used herein, unless otherwise specified, a proximal direction or location is a direction or location closest to where a ligature will extend to carry a tensile force applied to the ligature attachment device and a distal direction or location is in the opposite direction, generally in the direction of a tool coupled to the ligature attachment device.

One Example Embodiment of a Ligature Attachment Device

Referring now to the drawings wherein like reference numerals designates corresponding or similar elements throughout the views herein, FIG. 1 is a perspective view of one example embodiment of a ligature attachment device 100 comprising a proximal section comprising a loop retainer section 130, a distal section comprising a tool section 150, a central section comprising a central ligature spool section 110 having a cinching means, where a centrally located cinch aperture 120 is formed, and the central ligature spool section 110 is coupled to the loop retainer section 130 and the tool section 150. As shown, the loop retainer section 130 has a loop retainer cross-sectional profile configured to retain a loop of the ligature frictionally engaged with the central ligature spool section 110, the cinch aperture 120 has a cinch aperture shape configured to allow at least two sections of a ligature to be removably retained in the cinch aperture 120 whereby the cinch aperture 120 can removably retain the loop of the ligature.

The ligature attachment device 100 is shown having a slot shaped cinch aperture 120 centrally located within the ligature spool 110 and collinear with the ligature attachment device 100 center longitudinal axis, and where an oval shaped loop retainer 130 is integrally formed at the proximal end of the spool section 110, while the tool section 150 is integrally formed at the distal end of the spool section 110, where in this case a hook 151, which may be of any type, size, shape, or orientation a particular application may require, is shown as a tool incorporated into the design, where any tool which a particular application might require, such as but not limited to, an eyelet, or a carabiner, may be used in place of hook 151.

The ligature spool section 110 is located between, and integrally formed to the loop retainer section 130 and tool section 150, where all three sections are located along a center longitudinal axis of the ligature attachment device 100, while at least one cinch aperture 120 is cut through the ligature spool 110 perpendicular to the center longitudinal axis of the ligature attachment device 100. The side edges 113 of the ligature spool 110 are slightly tapered proximately outwards as they near the loop retainer section 130, where this is designed to tighten a ligature cinch termination when pushed proximally toward the loop retainer 130, and alternately loosen a ligature cinch termination when pushed distally toward the hook 151. However, the ligature spool 110 side edges 113 may alternately be parallel, curved, or any other contour a particular application may require. The ligature spool 110 may also have any type of surface finish such as smooth, knurled, coarse, jagged, or any other surface finish a particular application may require, for this and any other embodiment of the ligature attachment device disclosed herein, which will cause various degrees of friction on any ligature in contact with the ligature spool 110 surface.

Located centrally within the ligature spool 110 is at least one cinch aperture 120, which in this case, is a slot having a first end 121, a second, cinch end 122, and linear sides 123 tangent with the first end 121, and cinch end 122, where the cinch aperture 120 center longitudinal axis is collinear with the center longitudinal axis of the ligature attachment device 100. While most slot shaped cinch apertures would typically be formed along the center longitudinal axis of the ligature attachment device 100, the cinch aperture 120 may be of any orientation and placement a particular application may require. And while a slot shape is incorporated into this embodiment of the ligature attachment device 100, any shape aperture may be used in place of it, such as but not limited to a circle, rectangle, triangle, tapered slot, teardrop slot, compound slot, or any other shape, size, and combination of apertures, a particular application may require, for this and any other embodiment of the ligature attachment device disclosed herein. The ligature spool 110 may also have any type of surface finish such as smooth, knurled, coarse, jagged, or any other surface finish a particular application may require, for this and any other embodiment of the ligature attachment device disclosed herein, which will cause various degrees of drag on any ligature in contact with the cinch aperture 120 surface. In some embodiments, the cinch aperture 120 is a closed aperture with a continuous aperture interior wall defining the aperture. The cinch aperture is one example embodiment of a cinching means to frictionally engage and retain a section of the ligature with the ligature spool 110. The cinching means may be any method of frictionally engaging the ligature.

The loop retainer 130 is designed to prevent a looped section of a ligature, which is frictionally engaged with the ligature spool 110 and passes through the cinch aperture 120, from slipping over the proximal end of the ligature spool 110 and back through the cinch aperture 120. The loop retainer 130 accomplishes this by being wider than the ligature spool 110, but may be of any type, size, shape, or orientation a particular application may require, such as but not limited to, a circle, semicircle, or rectangle, which are wider than the ligature spool and will keep the ligature loop in place. In some embodiments, the loop retainer may simply be an extension of the ligature spool 110 which will also keep the ligature loop from slipping off the proximal end of the ligature spool 110. The loop retainer 130 generally provides a loop retaining means to retain the loop on and frictionally engaged with the ligature spool 110.

In this embodiment of the ligature attachment device 100, the tool section 150, is in the form of a hook 151, which may be of any type, size, and orientation a particular application may require, while being integrally part of the ligature attachment device 100, where the shank of the hook 151 depends outwardly from the distal end of the ligature spool 110, along the center longitudinal axis of the ligature attachment device 100, with the bend of the hook 151 being furthest from the ligature spool 110.

The tool section 150 may comprise any type of first tool or coupling device in order to removably join a second tool or coupling device to the ligature attachment device 100, where some embodiments of the tool section 150 may comprise at least one tool such as but not limited to, an eyelet, carabiner, or quick link of any size, type, and orientation a particular application may require, for this and any other embodiment of the ligature attachment device disclosed herein. The tools section 150 generally provides a means for coupling a tool, or another ligature, to the ligature attachment device 100.

The ligature attachment device 100, and any other embodiments thereof, may be made of any material a particular application may require such as, but not limited to rigid or semi-rigid materials, metal, polymer, elastomer, wood, or a combination of such. While additionally, the ligature attachment device may be produced by any manufacturing process a particular application may require, such as but not limited to being, stamped or thermally formed from sheet material, machined from thicker material, molded with a shelled interior and structural ribbing, cast as one solid unit, or 3D printed.

The overall dimensions of any embodiment of the ligature attachment device may be any dimension that is suitable for that particular ligature and that particular application of the device. Where a ligature attachment device is designed to operate with a particular ligature size, the same ligature attachment device may also be able to accommodate smaller diameter ligatures as well. Where for example only, one size ligature attachment device could be designed for ¾ inch diameter rope that will fit within its cinch aperture, that device may also fit smaller diameter ligatures such as but not limited to ½ inch rope, 3/16 inch cord, and ⅛ inch string. As another example only, where a smaller ligature attachment device could be designed for ¼ inch rope that will fit within its cinch aperture, that device may also fit 3/16 inch cord and ⅛ inch string. As another example only, where a smaller ligature attachment device could be designed for 3/16 inch cord or less, or where an even smaller ligature attachment device could be designed for ⅛ inch string or less.

When the ligatures used are smaller than the optimal size for which the ligature attachment device is designed, the smaller ligature may be looped around the ligature spool section at least one additional revolution when cinch terminating, for each time the size of the smaller diameter ligature is divisible into the size of the optimal diameter ligature. For instance, if a ⅛ inch string is being cinch terminated onto a ligature attachment device designed for ¼ inch rope, the optimal ¼ inch diameter rope is divisible by two of the ⅛ inch diameter, therefore the ⅛ inch diameter string would be wrapped two additional revolutions around the ligature spool. As another example, if a 3/16 inch cord is being cinch terminated onto a ligature attachment device designed for ¼ inch rope, the ¼ inch diameter rope is divisible by one diameter of the 3/16 inch cord, therefore the 3/16 inch diameter cord would be wrapped one additional revolution around the ligature spool. The extra ligature revolutions are created around the ligature spool the same way in which a rubber band is looped consecutively around a pony tail of hair, where to add additional loops, a looped ligature is rotated 180 degrees and then the loop is passed over either end of the ligature attachment device and seated around the spool section of the device, and then repeated for any additional revolutions around the ligature spool that are required.

Figure 2A:
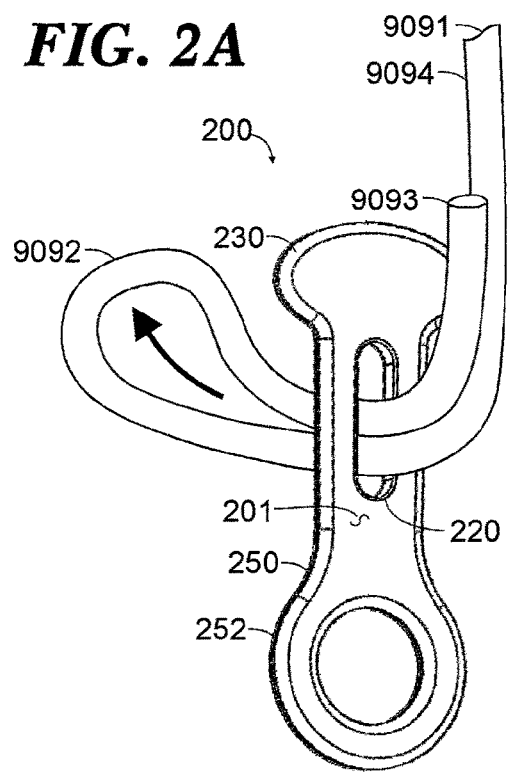
FIGS. 2A, 2B, 2C are a sequence of images illustrating how a ligature is removably cinch terminated to the ligature attachment device incorporating an eyelet as another example of how the tool section may be configured.

Referring now to FIG. 2A which is the first of three images in a sequence illustrating how a ligature 9091 would be removably cinch terminated to the ligature attachment device 200. In this example embodiment of the ligature attachment device 200, the tool section 150 is in the form of an eyelet 152 where a looped section of ligature 9092 is fed through the slot shaped cinch aperture 220 from the near side 201 to the far side of the ligature attachment device 200, as indicated by the arrow, with the folded back short lead 9093 closest to the loop retainer 230. Because the cinch aperture shape is a slot shape, this encourages one of the ligature sections, here section 9093, to be overlapped by another section, here section 9094. This overlap, together with the frictional engagement of the ligature section 9093 against the walls of the cinch aperture 220, provides a frictional resistance to keep the ligature section 9093 from pulling back through the cinch aperture 220. The ligature section 9094 of ligature 9091 leads to the load bearing section of ligature 9091.

Figure 2B:
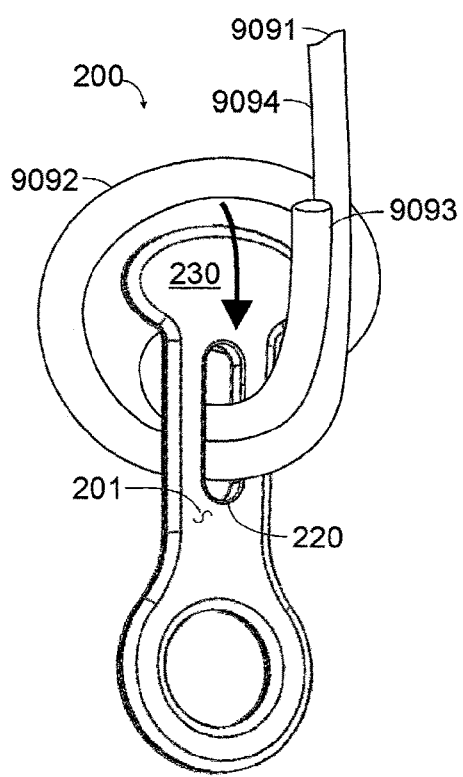

Referring now to FIG. 2B where the looped section 9092 of ligature 9091 is rotated 90 degrees so that the ligature sections 9093, 9094 cross and overlap as they pass through the cinch aperture 220, where the ligature loop 9092 is pulled over the loop retainer 230 from the far side to the near side 201 of ligature attachment device 200, as indicated by the arrow.

Figure 2C:
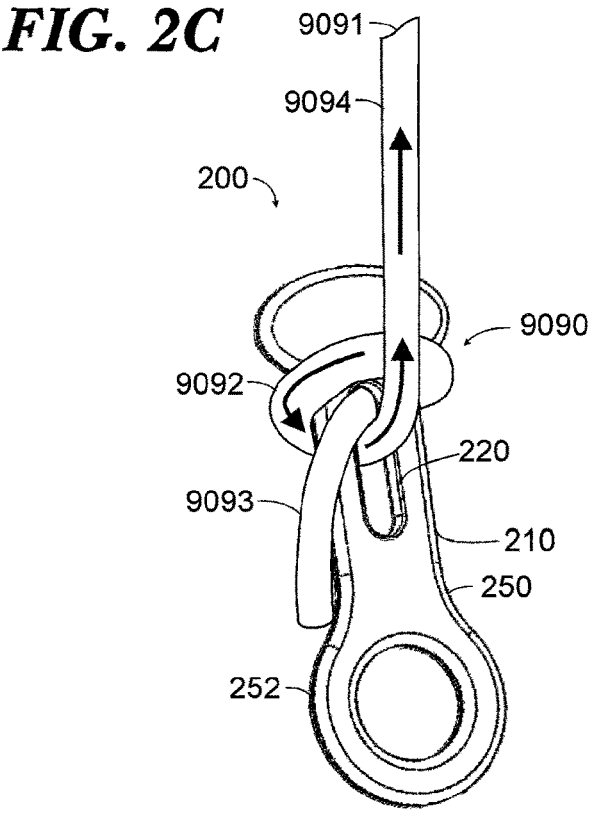

Referring now to FIG. 2C where the slack in ligature 9091 is taken out of the cinch termination 9090 by pulling and dressing the slack in ligature 9091 in the direction indicated by the arrows until all the slack is removed, where the load lead 9094 may now have a load applied to it by way of applying a load to the tool section 250, being the eyelet 252, provided the free end of the load lead 9094 has been anchored elsewhere. As can be seen, the positioning of the ligature section 9094 against the surface of the ligature loop 9092 also provides additional frictional resistance to keep the ligature section 9093 from being pulled back through the cinch aperture 220. Following the previous steps in reverse will allow for easy removal of the ligature 9091 from the ligature attachment device 200.

The cinch termination 9090 is afforded its strong grip, by the ligature spool 210 and cinch aperture 220 forcing the ligature 9091 to follow a series of at least seven ninety degree bends, causing a tremendous amount of friction and drag on the ligature 9091, while the load lead 9094 cinches down against the short free lead 9093 at the proximal end of the slot as a load is applied, forcing the short free lead 9093 to be wedged into the proximal end of the cinch aperture 220 slot, greatly compounding the amount of drag and friction applied to the ligature 9091, making it difficult for the load lead 9094 to be pulled out of the ligature attachment device 200.

Referring now to FIG. 3A, the ligature attachment device 300 is a multi-piece ligature attachment device in the form of a pair of ligature attachment devices 300A, 300B which are similar to the ligature attachment device 100 in FIG. 1 with the exception of less rounded edges and four additional features. The first two additional features comprise a male alignment pin 331 and a female alignment socket 332 which are incorporated into this embodiment 300 of the ligature attachment device for aligning and mating two ligature attachment devices 300A, 300B together. Each of the ligature attachment devices have a mating face 302 which can be mated, mating face 302 to mating face 302, so that both ligature spools 310 and loop retainers 330 align with each other, and are prevented from moving out of alignment when the two ligature attachment devices 300A, 300B are mated properly. In this embodiment, the male alignment pin 331 is located on the mating face 302 of the loop retainer 330, off to the side of the center longitudinal axis of the ligature attachment device 300 while the corresponding female alignment socket 332 is located on the same mating face 302 of the loop retainer 330, but located on the opposite side of the center longitudinal axis than the male alignment pin 331, and positioned the same distance from the center longitudinal axis and the most distal edge of the loop retainer, causing both alignment devices to align with, and engage their respective mate, when the two ligature attachment devices 300A, 300B are mated together. There is enough draft and tolerance between the alignment pin 331 and alignment socket 332 that they can mate coaxially, and also at an angle without binding. The male alignment pin 331 and female alignment socket 332, may be of any other shape a particular application may require such as but not limited to a square, rectangle, or oval, provided the male alignment pin 331 fits within the female alignment socket 332, where alternately the female alignment socket 332 can be cut completely through the loop retainer 330 creating an aperture.

A third additional feature shown in the example embodiment of FIG. 3A comprises a chamfer cut 335 into the mating face 302 of the loop retainer 330, perpendicular to the ligature attachment device 300 center longitudinal axis, and across the proximal end of the loop retainer 330. The adjoining edge of the chamfer cut 335 and the mating face 302 creates a fulcrum 336 along the vertex of mating face 302 and chamfer cut 335 face.

A fourth additional feature shown in the example embodiment of FIG. 3A comprises at least one ligature aperture 333 where the ligature aperture 333 shape comprises a rounded slot shape, but may be of any shape a particular application may require, large enough to fit at least one ligature through, but may be of any size a particular application may require. The ligature aperture 333 may be located anywhere on the loop retainer 330, but is typically located along the center longitudinal axis of the ligature attachment device 300. The ligature aperture 333 may serve several functions such as, helping to keep a cinch termination from loosening by creating friction and drag on a load bearing section of the ligature, and causing the ligature attachment device 300 to hang in a more vertical position than without the ligature aperture 333.

While a hook 351 is used as an example of the tool section 350 for this embodiment of the ligature attachment device 300, any device at all may be used to substitute the hook 351 as a particular application may require, such as but not limited to an eyelet.

Some embodiments of the ligature attachment device 300 may also be used singularly as a hook 351, or for example, an eyelet if the tool section 350 of a single ligature attachment device is an eyelet.

Figure 3B:
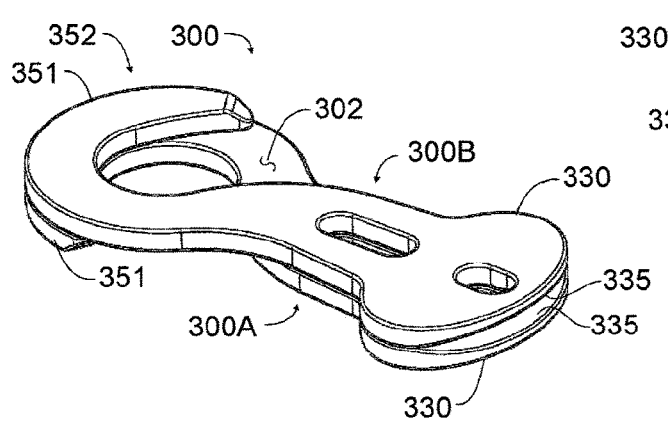

Referring now to FIG. 3B, a perspective view is shown of the two ligature attachment devices 300A, 300B in the mated position, where the chamfer cuts 335 across the proximal edge of the loop retainers 330 are visible, creating a wedge shaped chamfered gap, between the two loop retainers 330, while the hooks 351 face in opposite directions defining an eyelet shape 352 when mated together properly. The chamfer cuts 335 create a chamfered surface on the mating face 302 of the ligature attachment devices 300A and 300B.

Figure 3C:
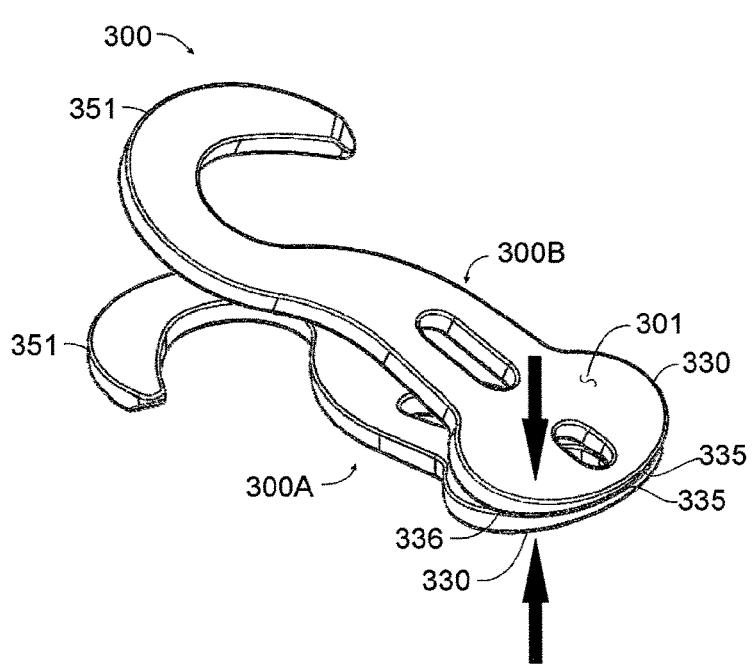

Referring now to FIG. 3C, the loop retainers 330 are pressed together on the outer face 301 at the chamfer 335, indicated by the opposing arrows, causing the two ligature attachment devices 300A, 300B to pivot against each other at the fulcrums 336, which cause two hooks 351 to separate. The hooks 351 are then able to engage and lock onto an object, while the alignment pins 331 and alignment sockets 332 stay partially mated, thus helping to keep the two ligature attachment devices 300A, 300B aligned with each other.

The hooks 351 may then be brought together by pressing on the outer faces 301 of the ligature attachment devices 300A, 300B anywhere there is no chamfer cut 335, enabling the hooks 351 to lock onto anything that will fit within them, where this can be done before or after cinch terminating a ligature to the ligature attachment devices 300A, 300B using the previously shown method at FIGS. 2A, 2B, 2C.

Referring now to FIG. 4, an example embodiment of a ligature attachment device 300 comprising two ligature attachment devices 300A, 300B is shown with the two devices in the mated position and hanging vertically with a ligature 9091 cinch terminated 9090 to them. The ligature attachment devices 300A, 300B incorporate ligature apertures 333 in the proximal portion of the loop retainers 330 in order to help the ligature attachment device 300 to hang in a more vertical orientation, while helping to keep the load lead 9094 of ligature 9091 taught and from allowing the cinch termination 9090 to loosen. This cinch termination 9090 is slightly different from the one shown in FIGS. 2A, 2B, 2C, where the ligature loop 9092 may be passed over the tool sections 350, rather than the loop retainers 330, which allows the load lead 9094 to be threaded through the ligature apertures 333 before or after making the cinch termination 9090. As shown, the cinch termination 9090 and ligature 9091 are wrapped around and through the two mated ligature attachment devices 300A, 300B. This configuration helps keep the two ligature attachment devices 300A, 300B from moving out of alignment, and from being pulled apart, provided there is a load applied to the ligature attachment devices 300A, 300B and load lead ligature 9094.

Referring now to FIGS. 5A, 5B, 5C, 5D, 5E, 5F, a set of 6 plan views of the ligature attachment device 300 are shown with FIG. 5A being a right side view, FIG. 5B being a distal end view, FIG. 5C being a front, or outer face 301, view, FIG. 5D being a proximal end view, FIG. 5E being a left side view, FIG. 5F being a back, or mating face 302, view.

Referring now to FIGS. 5G, 5H, 2 perspective views of the ligature attachment device 300 are shown with FIG. 5G being a perspective view featuring the front face 301, FIG. 5H being a perspective view featuring the mating face 302.

Referring now to FIG. 6A, a perspective view featuring the front face 401 of another embodiment 400 of the ligature attachment device is shown, where unlike previous embodiments of the ligature attachment device described herein, the loop retainer 430 shape is a rectangular shape and its side edges 438 are tangent with the rectangular ligature spool section 410 edges 411, which in turn are tangent with the outside edge 455 of the tool section 450 eyelet 452 causing the sides of the ligature attachment device 400 to be linear and parallel with each other. It is anticipated that the sides of the ligature attachment device may be tapered, curved, or any other shape a particular application requires.

In the example embodiment of FIG. 6B, a large ligature aperture 433 is formed centrally within the loop retainer 430 and is contoured inside the outer perimeter of the loop retainer 430 and along its border with the ligature spool 410, while being large enough to retain four sections of ligature within. In this embodiment, and as shown in FIG. 6C, at least one ligature guide 440 is formed on at least one side of the loop retainer 430, in the shape of an inverted "U" channel.

Referring again to FIG. 6A, the ligature guide 440 may be partially formed on the ligature spool 410 as well, in order to enhance the ligature attachment device 400 strength, while centered on, and running parallel to, the center longitudinal axis of the ligature attachment device 400, straddling the ligature aperture 433. The ligature guide 440 having a shape large enough to retain at least two optimal size ligatures within, however, the ligature guide 440 may be of any size a particular application may require. A proximal end 441 of the ligature guide 440 may be slightly chamfered and angled towards its center in order to aid in insertion of at least two ligatures. The distal end 442 of the ligature guide 440 may be more aggressively chamfered and angled towards its center so that at least four sections of ligature can be passed through this opening and out through the ligature aperture 433 for lied in the loop retainer 430. The large ligature aperture 433 may serve as an aid in threading ligatures through the ligature guide 440, while the loop retainer 430, combined with the ligature guide 440, helps to keep a cinch termination from loosening by containing ligatures within, while also causing the ligature attachment device 400 to hang in a more vertical position.

As shown in FIG. 6A, the cinch aperture 420 shape is a compound slot shape formed centrally within the ligature spool 410, comprising two different width slots connected collinear end to end as one combined slot, with a first slot being a dress slot 426 wide enough to allow at least two sections of an optimal diameter ligature to pass through freely. In this embodiment, the dress slot 426 is located distally from a second slot being a grip slot 427 that is narrow and long enough to lightly grip at least two sections of an optimal diameter ligature. In this embodiment, the grip slot 427 is approximately 60 percent of the width of, and located proximal to, the dress slot 426, with the total cinch aperture 420 having a length being long enough to allow at least four sections of an optimal diameter ligature to be removably retained within whereby the cinch aperture 420 can removably retain at least two loops of an optimal diameter ligature. The cinch aperture 420 has a smooth transition 425 between the dress slot 426, and the grip slot 427, allowing a ligature to be slid from one of the slots to the other without snagging on the transition 425 between the two.

As shown in FIG. 6A, the tool section 450 shape is an eyelet shape 452, comprising at least one eyelet 452 having an outer perimeter 455 that is tangent with the side edges 411 of the ligature spool 410. In this embodiment, the tool section 450 is integrally part of the ligature attachment device 400 where a proximal portion of the eyelet 452 is formed integrally within the tool section 450, while the distal portion of the eyelet 452 is depending outwardly from the tool section, along the center longitudinal axis of the ligature attachment device 400.

An eyelet 452 is used as an example herein, but any tool may be incorporated into the tool section 450 of the ligature attachment device 400, as a particular application may require. It is anticipated that the tool section 450 shape may be of any size, shape, or orientation which a particular application may require.

Referring now to FIG. 6B a perspective view featuring the back face 402 of the ligature attachment device 400 is shown, where an unobstructed view is afforded of the large ligature aperture 433 that is formed centrally within the rectangular loop retainer 430.

Referring now to FIG. 6C, proximal end view A-A of the ligature attachment device 400 is shown, where the ligature guide 440 is formed on the near side 401 of the loop retainer 430.

Referring now to FIG. 7, a perspective view of the ligature attachment device 400, is shown with a cinch termination 9090 of a ligature 9091 securely and removably fastened to the proximal end of the ligature attachment device 400, while a spring hook 9081 is removably fastened to the eyelet 452 at a distal end of the ligature attachment device 400.

Figure 8A:
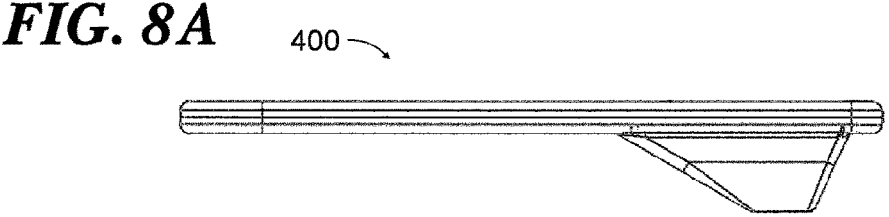
Figure 8A:
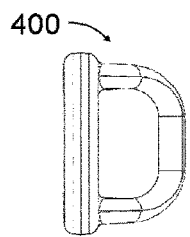
Figure 8A:
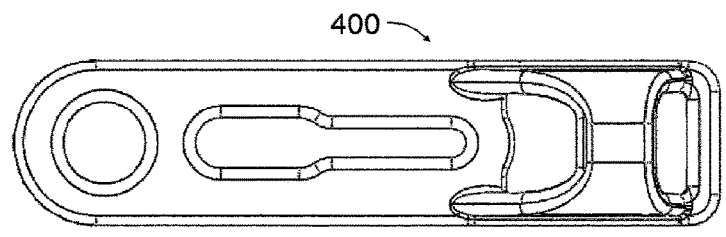
Figure 8A:
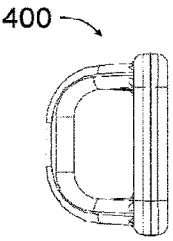
Figure 8E:
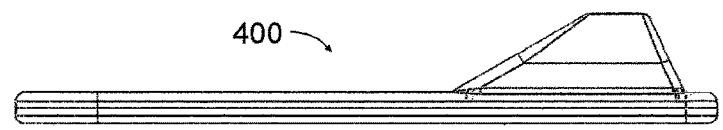
Figure 8F:
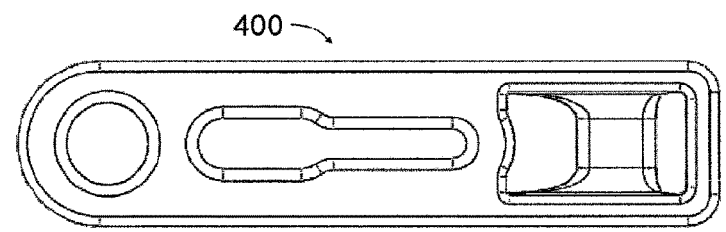

Referring now to FIGS. 8A, 8B, 8C, 8D, 8E, 8F, a set of 6 plan views are shown of the ligature attachment device 400 with FIG. 8A being a right side view, FIG. 8B being a distal end view, FIG. 8C being a front view, FIG. 8D being a proximal end view, FIG. 8E being a left side view, FIG. 8F being a back view.

Referring now to FIG. 9A, a perspective view featuring the front face 501 of another embodiment 500 of the ligature attachment device is shown, where this embodiment 500 is similar to the ligature attachment device 400 in FIG. 6A, except that the eyelet end 452 and dress slot 426 have been merged in order to form a multi-function compound slot 520 where the distal end radius 521 of the dress slot 526 has been enlarged to the size of the eyelet 452 in FIG. 6A. The sides 523 of the dress slot 526 are tangent with the large radius slot end 521 and are also tangent with the smooth transition 525 between the dress slot 526 and grip slot 527, making the dress slot 526 a tapered dress slot 526 that transitions 525 to the grip slot 527. This merging of the eyelet 552 and dress slot 526 allows for an overall shorter ligature attachment device 500, as compared to ligature attachment device 400.

While the tool section 550, eyelet 552, ligature spool 510, and cinch aperture 520 are merged in this embodiment 500 of the ligature attachment device, there still remains a distinct border separating these features which is drawn across the ligature attachment device 500 at the point where the outer curved profile 555 of the eyelet 552 joins the ligature spool 510 linear edge 511, whereby the tool section 550 and eyelet 552 are located on the distal side of this border, and the ligature spool 510 and cinch aperture 520 are located on the proximal side of this border.

Referring now to FIG. 9B, a perspective view featuring the back side 502 of the ligature attachment device 500 is shown, where an unobstructed view is afforded of the large ligature aperture 533 that is formed centrally within the rectangular loop retainer 530.

Referring now to FIG. 10, a perspective view of the ligature attachment device 500, is shown with a cinch termination 9090 of a ligature 9091 securely and removably cinch terminated, while a quick link 9082 is removably fastened to the tool section 550 eyelet 552.

One Example Embodiment of Methods of Using a Ligature Attachment Device

There are a number of ways to use embodiments of the ligature attachment device described above to removably terminate a ligature to the device. One method is to first take six to eight inches of ligature from a longer length of ligature and fold it back on the longer section of ligature. Next take the looped end and thread it through the proximal end of the ligature guide if applicable, then through the widest part of the cinch aperture from the near side to the far side with the shorter folded back end of the ligature closest to the loop retainer. Pull the loop through the far side of the cinch aperture about four inches, then twist the loop ninety degrees and bring it forward over the tool section to the near side. Next, work out all the slack in the ligature termination and push the termination as close to the loop retainer as possible. Any lose ligature or ligature end, may be threaded into or through any ligature apertures, or guides designed for holding them in place. The ligature is now securely and removably cinch terminated, while removing the ligature is as simple as reversing the steps used to terminate it.

Figure 11A:
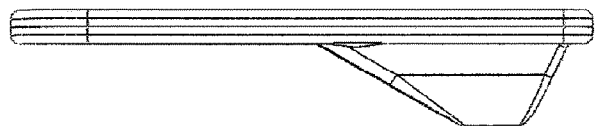
Figure 11B:
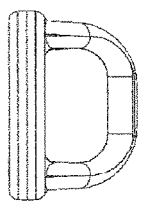
Figure 11C:
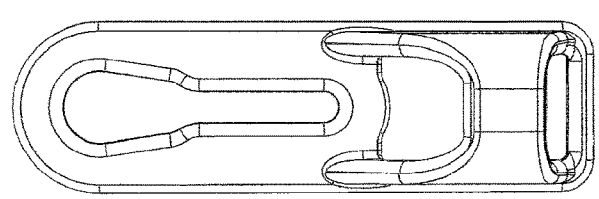
Figure 11D:
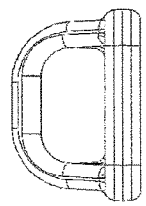
Figure 11E:
Figure 11F:
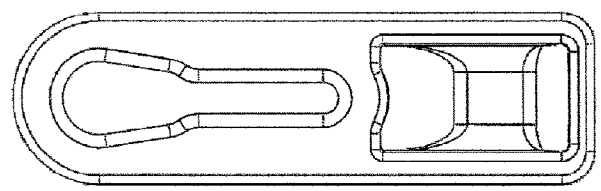

Referring now to FIGS. 11A, 11B, 11C, 11D, 11E, 11F, a set of 6 plan views are shown of the ligature attachment device 500 with FIG. 11A being a right side view, FIG. 11B being a distal end view, FIG. 11C being a front view, FIG. 11D being a proximal end view, FIG. 11E being a left side view, FIG. 11F being a back view.

Referring now to FIG. 12A, 12B, 12C, 12D, a series of sequential steps are shown to illustrate an example method of removably cinch terminating an optimal size ligature 9091 to the ligature attachment device 400. In these images, each step is represented by the letter "S" in conjunction with a step number and placed within a circle as not to be confused with reference characters. It is understood that these methods are not limited to the ligature attachment device 400. For example, these same methods may also be used for creating a ligature end cinch termination to the ligament attachment device 500.

Figure 12A:
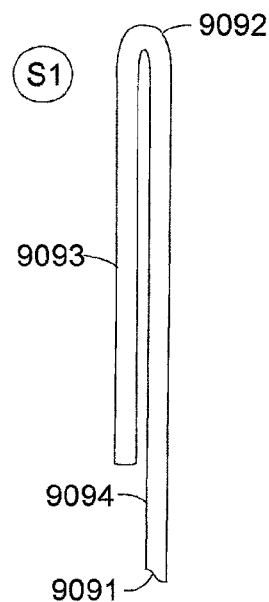

Referring now to FIG. 12A where in step 1 a length 9093 of ligature 9091 approximately six inches long is folded back on a longer length 9094 of the same ligature creating a loop 9092 at the fold.

Figure 12B:
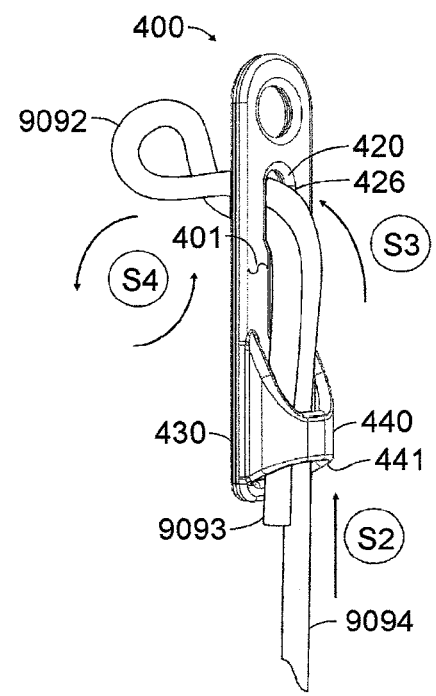

Referring now to FIG. 12B where in step 2 the loop 9092 is passed through the proximal end 441 of the ligature guide 440, where in step 3 the loop 9092 is passed through the dress slot 426 from the near side 401 to the far side, with the short lead 9093 closest to the loop retainer 430, where in step 4 the loop 9092 is rotated ninety degrees so that the ligature leads 9093, 9094 cross sides as they pass through the cinch aperture 420.

Figure 12C:
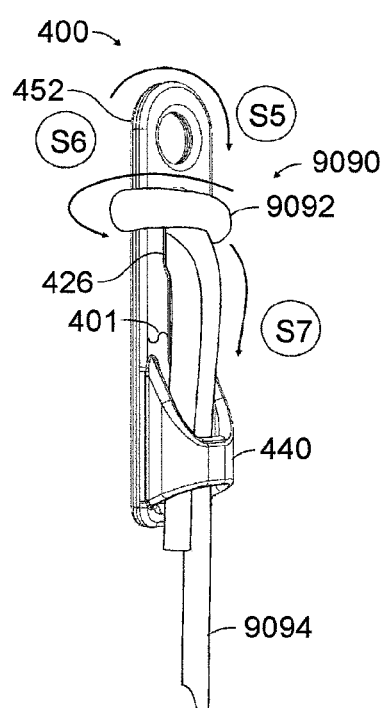

Referring now to FIG. 12C where in step 5 the loop 9092 is pulled up over the eyelet 452, from the far side to the near side 401, where in step 6 all the slack is drawn out of the cinch termination 9090 and pulled through the dress slot 426 from the far side to the near side 401, where in step 7 the load lead 9094 is pulled proximally through the ligature guide 440 to remove the slack.

Figure 12D:
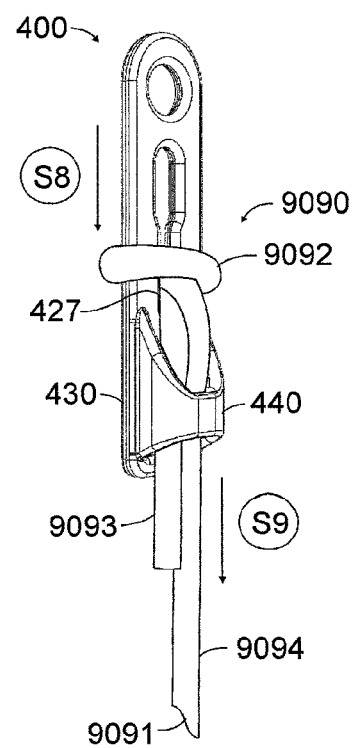

Referring now to FIG. 12D where in step 8 the cinch configuration 9090 is slid proximally toward the loop retainer 430 and into the grip slot 427, where the grip slot is made only narrow enough to hold the ligature from moving around, and is not designed to grip the ligature very hard, as it is the drag and friction of the cinch termination 9090 itself that prevents the ligature 9091 from being pulled out of the ligature attachment device 400. While in step 9 both the short lead 9093 and load lead 9094 are pulled proximally through the ligature guide 440 to remove any additional slack, while at this point the ligature 9091 is removably cinch terminated to the ligature attachment device 400. In order to remove the ligature 9091, the steps are simply followed in reverse.

Referring now to FIG. 13A, 13B, 13C, 13D, 13E, 13F, a series of sequential steps are shown as a method of removably cinch terminating an optimal size ligature 9091 to the ligature attachment device 400 in order to create a fixed loop configuration which could be used for hanging the ligature attachment device 400, or for a variety of other applications. In these images, each step is represented by the letter "S" in conjunction with a step number and placed within a circle as not to be confused with reference characters, while this same method may also be used for creating a fixed loop cinch termination to the ligament attachment device 500.

Figure 13B:
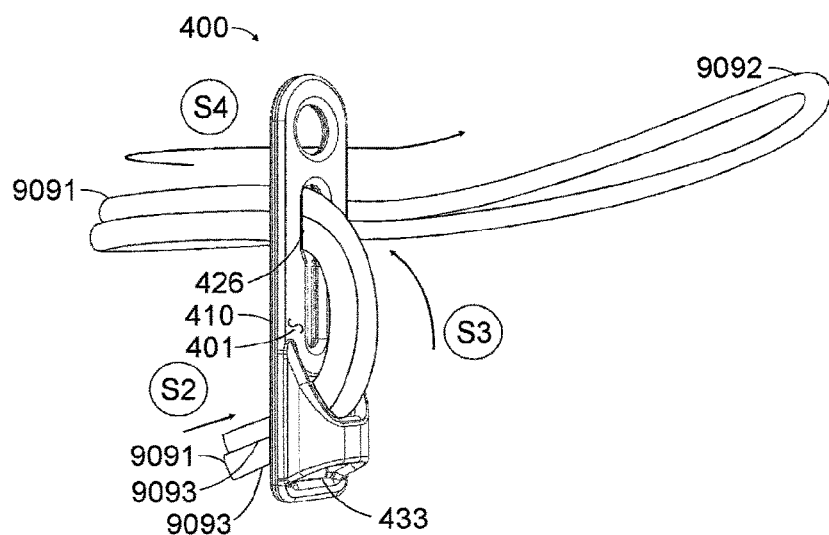
Figure 13A:
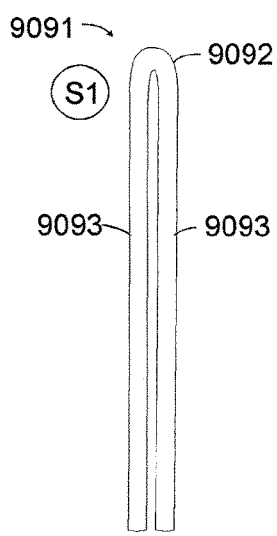

Referring now to FIG. 13A, where in step 1 a length of ligature 9091 approximately ten times the length of the ligature attachment device 400 is folded back on itself creating a loop 9092 and two ligature leads 9093.

Referring now to FIG. 13B, where in step 2 the loop 9092 is passed through the ligature aperture 433 from the far side toward the near side 401 of the ligature spool 410, where in step 3 the loop 9092 is passed through the dress slot 426 from the near side 401 to the far side, where in step 4 the loop 9092 is brought around the right side of the ligature spool 410.

Figure 13C:
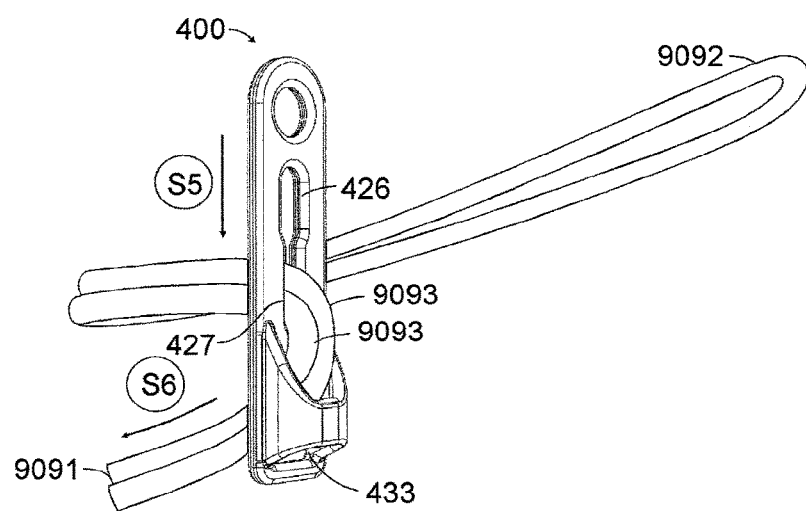

Referring now to FIG. 13C, where in step 5 the ligature leads 9093 in the dress slot 426 are slid down into the grip slot 427, where in step 6 the ligature leads 9093 are pulled out from the far side of the ligature aperture 433 to remove any slack.

Figure 13D:
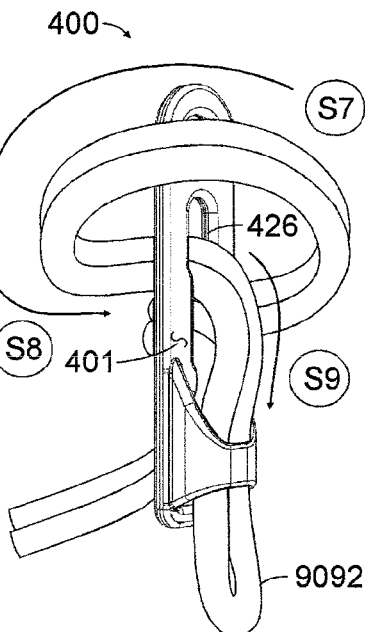

Referring now to FIG. 13D, where in step 7 the loop 9092 is wrapped around the ligature attachment device 400, from right to left and across the near side 401 of the ligature attachment device 400 to the far side, where in step 8 the loop 9092 is fed back through the dress slot 426 from the far side of the ligature attachment device 400 to the near side 401, where in step 9 the loop 9092 is fed proximally through the distal end of the ligature guide 440, and out the proximal end.

Figure 13E:
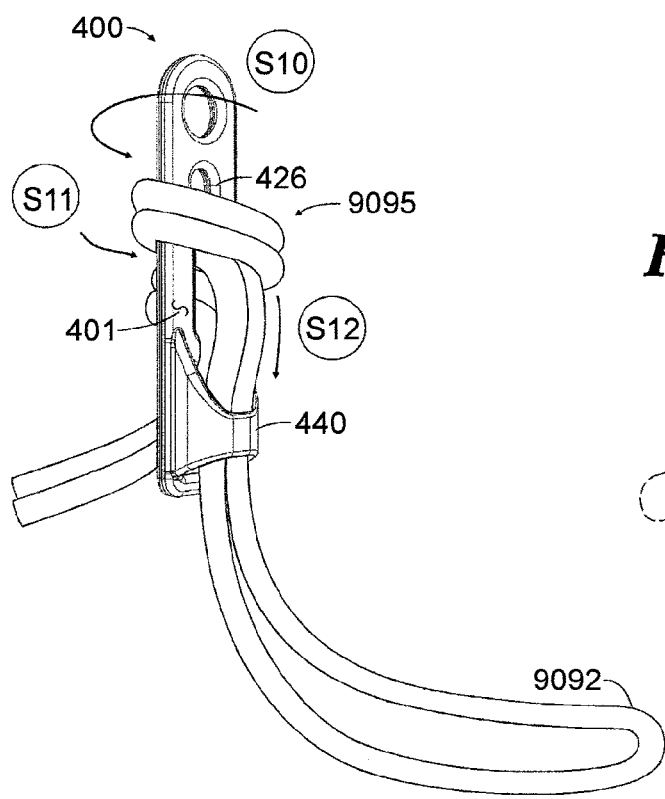

Referring now to FIG. 13E, where in step 10 all the slack is drawn out of the fixed loop cinch termination 9095, where in step 11 the slack is pulled through the dress slot 426, from the far side of the ligature attachment device 400 to the near side 401, where in step 12 the loop 9092 is pulled proximally through the ligature guide 440 to remove the slack, while at this point the ligature fixed loop cinch termination 9095 is secured.

Figure 13F:
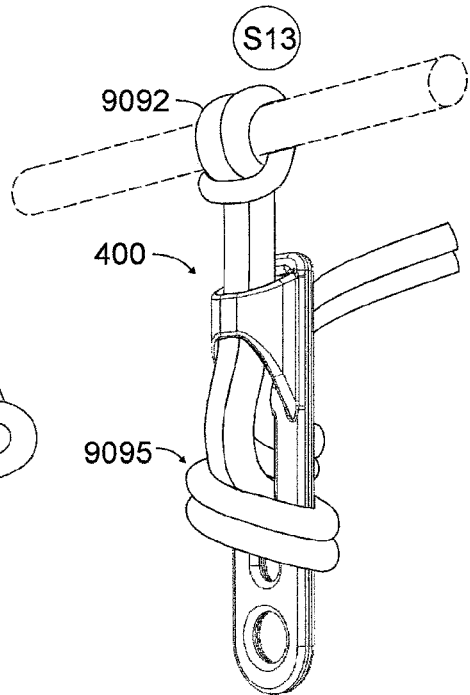

Referring now to FIG. 13F, where in step 13 the fixed loop 9092 of the fixed loop termination 9095 can be used to suspend the ligature attachment device 400, and where in order to remove the ligature 9091, these steps are simply followed in reverse order.

Referring now to FIGS. 14A, 14B, 14C, 14D, a series of sequential steps are shown as a method of removably cinch terminating an optimal size ligature 9091 to the ligature attachment device 400 in order to form a rope switch termination 9096, having a locked position 9096A and an unlocked position 9096B. In these images, each step is represented by the letter "S" in conjunction with a step number and placed within a circle as not to be confused with reference characters.

Figure 14A:
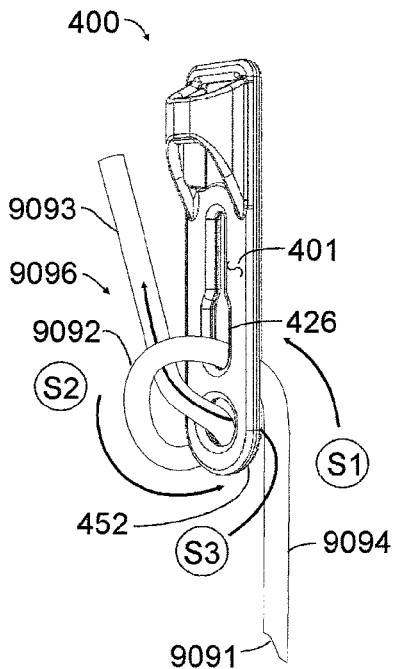

Referring now to FIG. 14A, where in step 1 an end 9093 of ligature 9091 is first passed through the dress slot 426 from the far side to the near side 401, where in step 2 the ligature end 9093 is brought around the left side of the ligature attachment device 400 to the far side, where in step 3 the ligature end 9093 is passed through the eyelet 452 from the far side to the near side 401 and then under the ligature loop 9092 on the left, where the ligature end 9093 is pulled up until the ligature loop 9092 cinches down on ligature end 9093, creating the rope switch cinch termination 9096 in the locked position 9096A.

Figure 14B:
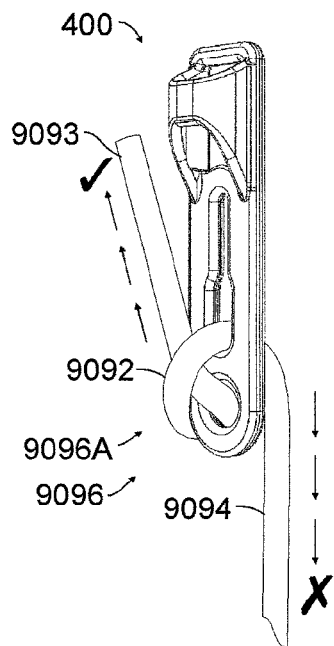

Referring now to FIG. 14B, which illustrates how once the rope switch cinch termination 9096 in the locked position 9096A is created using the steps in FIG. 26A, where the load lead 9094 is locked from being pulled downward and out of the rope switch cinch termination 9096. The rope switch 9096 is in the locked position 9096A as indicated by the downward pointing arrows and the "X", because the ligature loop 9092 on the left side of the ligature attachment device 400 is cinching down on the ligature end 9093. However, the ligature end 9093 can still be pulled upward with some force, as indicated by the upward pointing arrows and the check mark, thus retracting the load lead 9094.

Figure 14C:
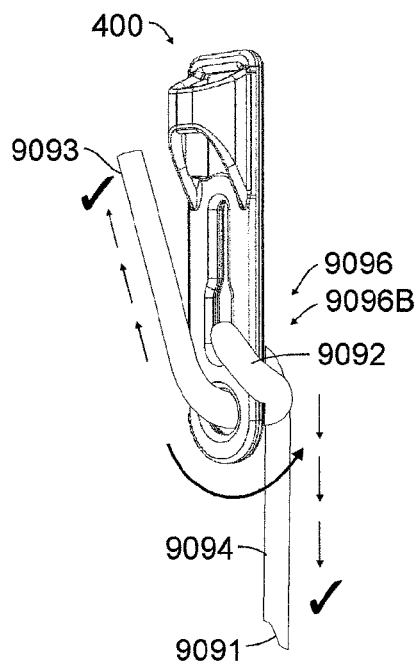

Referring now to FIG. 14C, which illustrates that when the ligature loop 9092 is moved from the left side of the ligature attachment device 400 to the right side, where the rope switch is in the unlocked position 9096B, as indicated by the curved arrow, and is no longer resting on top of the ligature end 9093. Where the load lead 9094 is now easily pulled downward, as indicated by the downward pointing arrows and the check mark, while still allowing the ligature end 9093 to be pulled in an upward direction, as indicated by the upward pointing arrows and the check mark. Where in other words, the ligature 9091 can now be pulled in either direction.

Figure 14D:
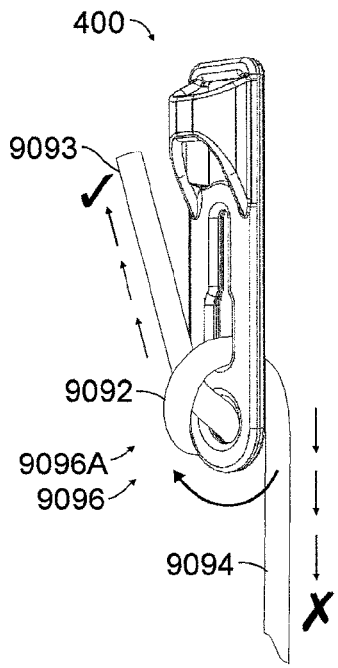

Referring now to FIG. 14D, which illustrates that in order to set the rope switch configuration 9096 back to the locked position 9096A, the ligature loop 9092 is simply pushed back to the left side of the ligature attachment device 400, as indicated by the curved arrow, and the load lead 9094 is once again locked from being pulled out of the rope switch cinch termination 9096, as indicated by the downward pointing arrows and the "X".

Referring now to FIG. 15, the ligature attachment device 400 is shown with two separate ligature terminations, a fixed loop termination 9095 and a rope switch termination 9096. This combination of cinch terminations with the ligature attachment device 400 would be ideal for hanging and adjusting the height of a fender 9083 for a boat, a green screen background, or anything else that that can be hung from a ligature and requires its height to be adjustable.

Referring now to FIG. 16, a collection of various embodiments of the ligature attachment device is shown in order to illustrate some of the embodiments of which the ligature attachment device may be configured, depicting one embodiment of the ligature attachment device 100 with a hook as its tool, another embodiment of the ligature attachment device 200 with an eyelet as its tool, and another embodiment of two mating ligature attachment devices 300 which creates an eyelet, still another embodiment of the ligature attachment device 400 having an eyelet as the tool section, while having a rectangular loop retainer with a ligature guide disposed on its front side, and lastly an embodiment of the ligature attachment device 500, where its eyelet, ligature spool, and cinch aperture, are merged into a combination of these features.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

I claim:

1. A ligature attachment device for use with a ligature, the ligature attachment device comprising:
   a proximal section comprising a loop retainer section;
   a distal section comprising a tool section;
   a central section comprising a ligature spool section having a cinch aperture located centrally;
   the ligature spool section coupled to the loop retainer section and the tool section;
   the loop retainer section having a loop retainer cross-sectional profile configured to retain a loop of the ligature frictionally engaged with the ligature spool section;
   the cinch aperture having a cinch aperture shape configured to allow at least two sections of a ligature to be removably retained in the cinch aperture whereby the cinch aperture can removably retain the loop of the ligature;
   the tool section comprising a tool;
   wherein the loop retainer section further comprises at least one ligature aperture;
   wherein the ligature aperture has a shape configured to allow at least one section of a ligature to be removably retained in the ligature aperture;
   wherein the ligature aperture has a contoured shape following a perimeter of the loop retainer section and a border of the loop retainer section with the ligature spool, leaving a frame of the loop retainer section configured large enough to allow at least four sections of the ligature to be removably retained in the ligature aperture; and
   wherein the loop retainer further comprises:
      at least one ligature guide, formed on at least one side of the loop retainer,
      the ligature guide having a ligature guide shape of an inverted "U" channel,
      the ligature guide shape straddling the ligature aperture,
      the ligature guide shape being large enough to allow at least two sections of a ligature to be removably retained in the ligature guide and the ligature guide may also extend partially onto the ligature spool.

2. The ligature attachment device of claim 1 wherein the tool comprises a first tool and the first tool is configured to removably couple a second tool to the ligature attachment device.

3. The ligature attachment device of claim 2 wherein a first tool comprises a hook.

4. The ligature attachment device of claim 2 wherein a first tool comprises an eyelet.

5. The ligature attachment device of claim 1 wherein the ligature is a rope.

6. The ligature attachment device of claim 1 wherein the ligature is a rope having a diameter of no greater than about ½ inch.

7. The ligature attachment device of claim 1 wherein:
the ligature spool section has a rectangular shape with a width and a length configured to contain a cinch aperture;
the loop retainer section is formed at a proximal end of the ligature attachment device; and
the tool section is formed at a distal end of the ligature attachment device.

8. The ligature attachment device of claim 1 wherein the cinch aperture shape is a slot shape.

9. The ligature attachment device of claim 1 wherein:
the cinch aperture shape is a compound slot shape formed centrally within the ligature spool; and
the compound slot shape comprising two different width slots which are connected collinear end to end as one combined slot, while having a smooth transition between the two slots.

10. The ligature attachment device of claim 1 wherein:
the loop retainer shape comprises an oval shape;
the oval shape having a length along a longitudinal axis of the ligature attachment device;
the length being shorter than a width perpendicular to the longitudinal axis; and
the oval shape width being larger than a width of the ligature spool section.

11. The ligature attachment device of claim 1 wherein:
the loop retainer section having a rectangular shape;
the loop retainer section positioned adjacent to a proximal end of the ligature spool section; and
a length of the rectangular shape along a longitudinal axis of the ligature attachment device is at least one half of a length of the central ligature spool section.

12. The ligature attachment device of claim 1 wherein a mating face of the loop retainer further comprises at least one male alignment pin whereby the male alignment pin is positioned to engage with at least one female alignment socket of a second ligature attachment device.

13. The ligature attachment device of claim 1 wherein:
a mating face of the loop retainer further comprises at least one female alignment socket whereby the female alignment socket is positioned to engage at least one male alignment pin of a mating ligature attachment device;
the female alignment socket comprising at least one interior wall that defines an open void within the loop retainer's mating face;
the female alignment socket being of a shape and size able to removably mate with a similarly shaped male alignment pin within its interior; and
wherein the mating between the male alignment pin and the female alignment socket allows them to align both collinear and at an angle to each other without binding.

14. The ligature attachment device of claim 1 wherein:
the ligature attachment device comprises a multi-piece ligature attachment device comprising the ligature attachment device and a second ligature attachment device;
the second ligature attachment device comprising a second tool section and a second mating face;
the loop retainer further comprising an outside face surface and an inside face surface;
the inside face surface having a mating face surface and a chamfered surface;
the chamfered surface located at a proximal portion of the inside face surface;
a vertex of an adjoining edge of the mating face surface and the chamfered surface defining a fulcrum on the inside face surface perpendicular to a center longitudinal axis of the ligature attachment device;
the chamfered surface configured to define a chamfer gap between the chamfered surface and a second chamfered surface when the mating face surface is flush with the second mating face surface of the second ligature attachment device;
the chamfered surface configured to define a tool gap between the mating face surface and the second mating face surface at a distal portion of the ligature attachment device when the chamfered surface is flush with the second chamfered surface of the second ligature attachment device;
the tool section of the ligature attachment device comprising a hook having a hook opening; and
the second tool section of the ligature attachment device comprising a second hook having a second hook opening positioned on an opposite side of the ligature attachment device whereby the hook and the second hook form an eyelet shape when the mating face surface is flush with the second mating face surface and whereby the hook and the second hook may then be separated and able to removably engage a third tool.

15. The ligature attachment device of claim 1 wherein:
the tool section, the spool section, and the cinch aperture are merged together;
the tool section is an eyelet merged with the distal end of the cinch aperture; and
a distal end of the cinch aperture to be as large as the eyelet.

16. The ligature attachment device of claim 1 wherein:
the tool section comprises a first tool and the first tool is configured to removably couple a second tool to the ligature attachment device;
the first tool shape comprises an eyelet shape;
the ligature is a rope;
the ligature is a rope having a diameter of no greater than about ¾ inch;
a ligature spool shape of the ligature spool comprises a rectangular shape having a length along a longitudinal axis of the ligature attachment device and a width perpendicular to the longitudinal axis;
the rectangular shape being at least wide and long enough to contain a cinch aperture centrally within its perimeter;
the cinch aperture shape is a compound slot shape formed centrally within the ligature spool;
the cinch aperture shape comprising two different width slots connected collinear end to end as one combined slot and having a smooth transition between the two slots;
a loop retainer shape of the loop retainer is a rectangular shape adjacent to a proximal end of the ligature spool and having a loop retainer length of at least half of the length of the ligature spool;
the loop retainer further comprises at least one ligature aperture;

the ligature aperture having a ligature aperture shape contoured to follow the perimeter of the loop retainer whereby the loop retainer comprises a frame configured large enough to allow at least four sections of the ligature to be removably retained in the ligature aperture;

the loop retainer further comprises at least one ligature guide formed on the loop retainer;

the ligature guide may also extend partially onto the ligature spool; and the ligature guide having a ligature guide shape of an inverted "U" channel straddling the ligature aperture and large enough to allow at least two sections of the ligature to be removably retained in the ligature guide.

17. A method for cinch terminating the end of a ligature to the ligature attachment device of claim 1, the method comprising:

providing a ligature having an end section and a load section, folding the end section back onto the load section creating a ligature loop;

the ligature loop having a short lead and a long lead;

passing a portion of the ligature loop through the ligature guide;

passing a portion of the ligature loop through the cinch aperture with the short lead positioned closest to the loop retainer;

rotating the portion of the ligature loop ninety degrees and pulling the portion of the ligature loop over the tool section of the ligature attachment device; and pulling and working the ligature long lead around the ligature spool and through the cinch aperture whereby any slack is drawn out to the load section of the ligature, where finally, a cinch termination is moved as close to the loop retainer section as possible while drawing out any additional slack through the ligature guide to complete the cinch termination.

18. A ligature attachment device for use with a ligature, the ligature attachment device comprising:

a proximal section comprising a loop retainer section;

a distal section comprising a tool section;

a central section comprising a ligature spool section having a cinch aperture;

the ligature spool section integrally attached to the loop retainer section and the tool section;

the loop retainer section having a loop retainer cross-sectional profile larger than a ligature spool cross-sectional profile whereby the loop retainer section retains a loop of the ligature frictionally engaged with the ligature spool section;

the cinch aperture having an aperture shape configured to allow a first section of the ligature to be frictionally engaged with a cinch end of the cinch aperture;

the aperture shape further configured to allow a second section of the ligature to overlap and be frictionally engaged with the first section of the ligature whereby a tensile force on the second section of the ligature increases the frictional engagement of the first section of the ligature with the cinch end; and the tool section comprising a tool.

19. A ligature attachment device for use with a ligature, the ligature attachment device comprising:

a proximal section comprising a loop retaining means;

a distal section comprising a tool section;

a central section comprising a ligature spool section having a cinching means;

the ligature spool section integrally connected to the loop retainer section and the tool section;

the loop retaining means configured to retain a loop of the ligature frictionally engaged with the central ligature spool section;

the cinching means further configured to allow at least two sections of a ligature to be removably retained in the cinching means;

the cinching means further configured to allow a first section of the ligature to be frictionally engaged with the cinching means;

the cinching means further configured to allow a second section of the ligature to overlap and be frictionally engaged with the first section of the ligature whereby a tensile force on the second section of the ligature increases the frictional engagement of the first section of the ligature with the cinching means; and the tool section comprising a tool.

20. The ligature attachment device of claim 18 wherein the ligature is a rope.

21. The ligature attachment device of claim 19 wherein the ligature is a rope.

22. The ligature attachment device of claim 19 wherein the tool comprises a first tool and the first tool is configured to removably couple a second tool to the ligature attachment device.

23. The ligature attachment device of claim 22 wherein a first tool comprises an eyelet.

* * * * *